(12) United States Patent
Gundavelli et al.

(10) Patent No.: US 12,273,705 B2
(45) Date of Patent: Apr. 8, 2025

(54) PROVIDING AN OPERATOR-ENCRYPTED PARTIAL USER EQUIPMENT ROUTE SELECTION POLICY TO USER EQUIPMENT

(71) Applicant: Cisco Technology, Inc., San Jose, CA (US)

(72) Inventors: Srinath Gundavelli, San Jose, CA (US); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 17/874,549

(22) Filed: Jul. 27, 2022

(65) Prior Publication Data
US 2024/0040375 A1 Feb. 1, 2024

(51) Int. Cl.
*H04W 12/033* (2021.01)
*H04L 61/4511* (2022.01)
(Continued)

(52) U.S. Cl.
CPC ....... *H04W 12/033* (2021.01); *H04L 61/4511* (2022.05); *H04W 40/02* (2013.01); *H04W 84/042* (2013.01)

(58) Field of Classification Search
None
See application file for complete search history.

(56) References Cited

U.S. PATENT DOCUMENTS

2021/0385724 A1* 12/2021 Wang .................. H04L 41/5051
2022/0182358 A1 6/2022 Xiong
(Continued)

FOREIGN PATENT DOCUMENTS

WO 2020252281 A1 12/2020
WO WO202025228 A1 12/2020
(Continued)

OTHER PUBLICATIONS

Cisco, "Cisco Prime Network Registrar—DNS in Mobile Networks," https://www.cisco.com/c/en/us/products/collateral/cloud-systems-management/prime-network-registrar/white-paper-c11-731488.html, 2014, 14 pages.
(Continued)

*Primary Examiner* — Kenneth B Wells
(74) *Attorney, Agent, or Firm* — Edell, Shapiro & Finnan, LLC

(57) ABSTRACT

Presented herein are techniques to provide an operator-encrypted application specific user equipment (UE) route selection policy (URSP) to a UE via different network elements and/or distribution techniques. In one example, a method may include obtaining, by a network element, a policy object from a policy function of a mobile network operated by a mobile network operator, wherein the policy object comprises an application specific user equipment route selection policy (URSP) for an application in which the application specific URSP is encrypted by the policy function; and providing, by the network element, the policy object to a user equipment that has at least one session established with the mobile network, wherein the user equipment is to decrypt the application specific URSP to facilitate network communications for the application via the user equipment.

20 Claims, 6 Drawing Sheets

(51) Int. Cl.
*H04W 40/02* (2009.01)
*H04W 84/04* (2009.01)

(56) References Cited

U.S. PATENT DOCUMENTS

| | | | | |
|---|---|---|---|---|
| 2023/0136984 | A1* | 5/2023 | Lee | H04W 40/24 370/392 |
| 2023/0189115 | A1* | 6/2023 | Shekhar | H04W 40/12 370/329 |
| 2023/0362623 | A1* | 11/2023 | Lee | H04W 8/12 |
| 2023/0370944 | A1* | 11/2023 | Li | H04W 40/24 |
| 2023/0388909 | A1* | 11/2023 | Hedman | H04W 8/08 |
| 2024/0015630 | A1* | 1/2024 | Talebi Fard | H04W 8/08 |

FOREIGN PATENT DOCUMENTS

| | | | |
|---|---|---|---|
| WO | WO2021057794 | A1 | 4/2021 |
| WO | WO2022026482 | A1 | 2/2022 |
| WO | WO2022048261 | A1 | 3/2022 |

OTHER PUBLICATIONS

Cisco, "DNS-AS, DNS as Authoritative Source," https://content.cisco.com/chapter.sjs?uri=/searchable/chapter/content/en/us/td/docs/ios-xml/ios/qos_nbar/configuration/xe-16-6/qos-nbar-xe-16-6-book/nbar-dns-as.html.xml, published Aug. 6, 2019, 22 pages.

JT IoT, "eUICC vs eSIM: What is the difference between eSIM and eUICC?," https://blog.jtiot.com/euicc-and-esim-are-they-the-same-thing, published Mar. 5, 2019, 5 pages.

Nick Vs Networking, Telco Network Engineering, "5G Subscriber Identifiers—SUCI & SUPI," Acronyms and cryptography—a look at Subscriber Identifiers in 5G, https://nickvsnetworking.com/5g-subscriber-identifiers-suci-supi/, published Nov. 28, 2020, 10 pages.

3GPP, "3rd Generation Partnership Project; Technical Specification Group Services and System Aspects; Security architecture and procedures for 5G system," (Release 17) 3GPP TS 33.501 V17.6.0, published Jun. 2022, 292 pages.

3GPP, "Generation Partnership Project; Technical Specification Group Services and System Aspects; Telecommunication management; Charging management; Charging Data Record (CDR) parameter description," (Release 17) 3GPP TS 32.298 V17.3.0, published Jun. 2022, 254 pages.

3GPP, "3rd Generation Partnership Project; Technical Specification Group Core Network and Terminals; 5G System; UE Policy Control Service; Stage 3," (Release 17) 3GPP TS 29.525 V17.7.0, published Jun. 2022, 70 pages.

3GPP, "3rd Generation Partnership Project; Technical Specification Group Core Network and Terminals; 5G System; Network Exposure Function Northbound APIs; Stage 3," (Release 17) 3GPP TS 29.522 V17.6.0, published Jun. 2022, 447 pages.

3GPP, "3rd Generation Partnership Project; Technical Specification Group Core Network and Terminals; 5G System; Session Management Policy Control Service; Stage 3," (Release 17) 3GPP TS 29.512 V17.7.0, published Jun. 2022, 255 pages.

3GPP, "3rd Generation Partnership Project; Technical Specification Group Core Network and Terminals; 5G System; Access and Mobility Policy Control Service; Stage 3," (Release 17) 3GPP TS 29.507 V17.7.0, published Jun. 2022, 71 pages.

3GPP, "3rd Generation Partnership Project; Technical Specification Group Core Network and Terminals; Non-Access-Stratum (NAS) protocol for 5G System (5GS); Stage 3;" (Release 17) 3GPP TS 24.501 V17.7.1, published Jun. 2022, 991 pages.

3GPP, "3rd Generation Partnership Project; Technical Specification Group Services and System Aspects; Policy and charging control framework for the 5G System (5GS); Stage 2," (Release 17) 3GPP TS 23.503 V17.5.0, published Jun. 2022, 148 pages.

3GPP, "3rd Generation Partnership Project; Technical Specification Group Services and System Aspects; System architecture for the 5G System (5GS); Stage 2," 3GPP TS 23.501 V17.5.0, published Jun. 2022, 568 pages.

* cited by examiner

PROVIDING AN OPERATOR-ENCRYPTED PARTIAL USER EQUIPMENT ROUTE SELECTION POLICY TO USER EQUIPMENT

TECHNICAL FIELD

The present disclosure relates to network equipment and services.

BACKGROUND

Networking architectures have grown increasingly complex in communications environments, particularly mobile networking environments. In particular, different mobile network paradigms have been introduced involving different technologies and deployment environments, such as network slicing, third Generation Partnership Project (3GPP) private networks, neutral host radio access networks (RANs), combinations thereof, and the like. With the introduction of new mobile network paradigms, there are significant challenges in managing network communications and connectivity for wireless mobile network devices.

DESCRIPTION OF EXAMPLE EMBODIMENTS

Overview

Figure 1:
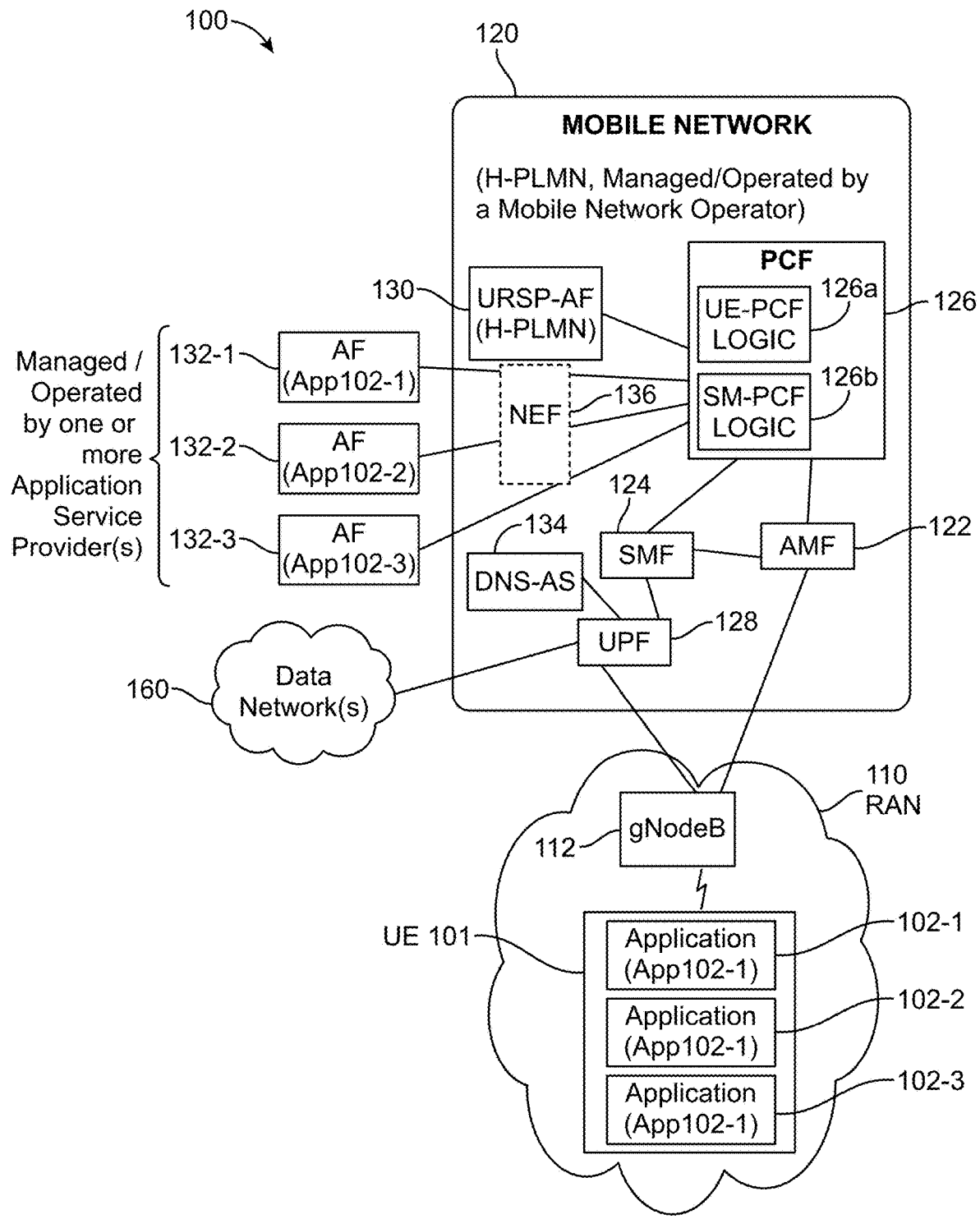
FIG. 1 is a block diagram of a system in which techniques may be implemented to provide an operator-encrypted partial user equipment (UE) route selection policy (URSP) to a UE, according to an example embodiment.

Generally, a user equipment (UE) route selection policy (URSP) is a policy element in the 3GPP 5G system architecture that includes various URSP rules, which allow a UE to make determinations or selections regarding how application traffic for a given application is to be routed via a mobile network. In the current 3GPP 5G system architecture, a URSP (containing one or more URSP rules) can be delivered to a UE through registration with a mobile network. The definition of URSP policy elements/rules continues to evolve with richer semantics such that URSPs/URSP rules continue to be augmented with new elements/information that can enhance user experience for different applications that may be operating via a UE.

In one embodiment, a method is provided that may include obtaining, by a network element, a policy object from a policy function of a mobile network operated by a mobile network operator, wherein the policy object comprises an application specific user equipment route selection policy (URSP) for an application in which the application specific URSP is encrypted by the policy function; and providing, by the network element, the policy object to a user equipment that has at least one session established with the mobile network, wherein the user equipment is to decrypt the application specific URSP to facilitate network communications for the application via the user equipment.

Example Embodiments

As referred to herein, a wireless wide area (WWA) access network, such as a cellular/Third (3rd) Generation Partnership Project (3GPP) access network, may be characterized as a Radio Access Network (RAN) having radio nodes (also referred to herein as access network radios) such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG or NG) access networks, Radio Units (RUs) for disaggregated virtualized RAN (vRAN) architectures, and/or the like that provide a larger RAN coverage area as compared to the RAN coverages area typically provided by wireless local area (WLA) radio nodes/access network radios (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node/access network radio is often larger than the WLA RAN coverage area provided by a WLA radio node/access network radio. Additionally, a WWA RAN radio node can typically provide radio access connectivity for a larger number of devices as compared to a WLA RAN radio node/access network radio. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., wireless devices, users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Additionally, with reference to various examples discussed herein, network slicing is a concept of 3GPP 5G system (5GS)/nG architectures. A network slice is a logical end-to-end network that can be dynamically created and may include any combination of 3GPP mobile network functions/functionality. Generally, a network slice, also referred to generally as a 'slice', 'instantiated slice', or 'slice instance', can refer to a group or set of Virtualized Network Functions (VNFs) that are configured to facilitate a certain mobile network service or group of mobile network services.

A given user equipment (UE) may have access to multiple network slices over the same Radio Access Network (RAN). Each network slice may serve a particular service type with an agreed upon Service-level Agreement (SLA). To provide mobile network services associated with a given network slice type, a slice of the given slice type can be instantiated in which the instantiated slice for the slice type can provide certain mobile network services to a number of UEs.

A network slice instance within a Public Land Mobile Network (PLMN) can include any combination of nG RAN and/or core network control plane and user plane network functions. Per-3GPP Technical Specification (TS) 23.501, a Single-Network Slice Selection Assistance Information (S-NSSAI) indicator can be used to uniquely identify a slice in which an S-NSSAI includes a Slice/Service Type (SST) indication, which indicates the expected slice behavior for a slice requested by a UE in terms of expected features and services, and, optionally, can include a Slice Differentiator (SD), which can be used to differentiate among multiple slices of a same SST.

Different types of network slices (network slice types) can be configured for a mobile network such that each slice type can provide certain mobile network services. As referred to herein and in the claims, the terms 'slice', 'slice instance', 'network slice', and/or variations thereof may be used interchangeably to refer to a type of network slice that can be instantiated (e.g., configured, created, validated, operated, managed, etc.) within a mobile network to provide one or more mobile network services for one or more user equipment. Various VNFs that can be configured for a slice type in accordance with techniques described herein can include any combination of 3GPP Fourth Generation/Long Term Evolution (4G/LTE) VNFs, 5G VNFs, 6G VNFs, etc., as may be prescribed, at least in part, by 3GPP standards.

Various example network slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a network slice requested by a wireless device (e.g., a UE) can be referenced generally as a number or value, formatted as "S-NSSAI. #" in various examples herein, in which the number (#) can correspond to an SST value and, optionally, an SD, in accordance with 3GPP specifications. It is to be understood that any SST values may be configured by a mobile network operator for other slice types. Additionally, slice type values used for various examples/embodiments described herein may differ from standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

Different applications (e.g., social networking applications, video streaming applications, enterprise applications, etc.) operating via a UE may utilize different network slice types. The type of network slice to be utilized for a particular application, as well as other network and/or application-specific information associated with network connectivity for a UE for the particular application can be signaled to a UE via one or more URSPs, as discussed in further detail herein.

Generally, a URSP is a policy element in the 3GPP 5G system architecture which allows a UE to make the determination on how the application traffic for a given application is to be routed via a mobile network. Generally, as currently prescribed by 3GPP Technical Specification (TS) 23.503, Version 17.5.0 (released June 2022), a URSP includes a number of rules in which each rule includes a rule precedence value, a traffic descriptor portion, and a route selection portion. The rule precedence value can be used by a UE to determine an order for enforcing different URSP rules that may be provisioned for the UE.

The traffic descriptor portion of a URSP rule can include descriptors/information that can be used by a UE to identify traffic for a given application in which such descriptors/information may include, but not be limited to an application identifier (ID) for an application, Internet Protocol (IP) descriptors for traffic associated with the application (e.g., source/destination address, source/destination port, etc.), domain descriptors (e.g., Fully Qualified Domain Name(s) (FQDN(s) or other criteria/descriptors) that can be used to match domain names for traffic associated with the application, Data Network Name (DNN) information, etc., as may be prescribed by 3GPP standards.

The route selection portion of a URSP rule can include descriptors/information that can be used by a UE for communicating application traffic, such as a Session and Service Continuity (SSC) mode to utilize for communications involving an application, a network slice to utilize for communications involving an application, a Protocol Data Unit (PDU) session type to utilize for communications involving an application, an access type (e.g., 3GPP access, non-3GPP access, or combinations thereof) to utilize for communications involving an application, DNN selection information, etc., as may be prescribed by 3GPP standards.

In current 3GPP 5G system architectures, a URSP can be delivered to a UE through registration with a mobile network. The definition of URSP policy elements continues to evolve with richer semantics such that URSPs continue to be augmented with new elements/information that can enhance user experience for different applications that may be operating via a UE.

In current 3GPP mobile network architectures, UE-PCF logic delivers a URSP policy (also referred to herein interchangeably as a "URSP") to a UE using a standards-based "MANAGE UE POLICY COMMAND" message. The UE, as part of its registration to a mobile network, provides information to the network indicating its supported operating system (OS) version via a standards-based "UE STATE INDICATION" message such that the UE-PCF logic can generate a URSP policy that is specific to the UE's OS version and also considers a subscription policy for the UE (e.g., for the user operating the UE).

The operator-centric, standards-based approach of URSP policy distribution has certain limitations. For example, the generated URSP policy for a UE may not have policy rules for all applications that may be installed on the UE. When such applications for which no URSP rules are configured for the URSP policy are operated via the UE, application traffic for the applications will typically be matched to a default URSP rule that the UE will utilize for communications involving the applications, which that can result in a bad quality of experience (QOE) for the UE/UE user. A mobile network operator typically has limited visibility into the installed set of applications for a UE and, therefore, typically cannot generate a URSP policy that includes rules for all the installed applications on the UE. Given the multitude of applications that can be installed on UEs, it may also not be practical for a mobile network operator to generate a URSP policy including rules for every application that could potentially be installed/operated on all UEs that may connect to a mobile network operated by the mobile network operator.

Accordingly, there is value in changing the current operator-centric model for URSP policy distribution in order to shift the URSP policy distribution role from a mobile network operator to an application-centric model in which URSP distribution can also be performed by other network elements, such as via an application function (AF) (operated by a mobile network operator) for one or more applications, via an AF and internet portal operated by an application service provider (ASP) for application(s), and/or via a Domain Name System (DNS) server for one or more applications.

Presented herein are various embodiments through which an application specific URSP for a given application can be provided to a UE via various network elements that may or may not be operated by a mobile network operator operating a mobile network with which the UE is registered/has one or more established PDU session(s). Such an application specific URSP can be provided to a UE for a particular application in addition to a URSP that can be provided to the UE from a mobile network. Thus, an application specific URSP provided to a UE for a particular application can be referred to interchangeably as an "application specific URSP" or a "partial URSP" for various embodiments discussed herein.

As discussed for embodiments herein, an application specific/partial URSP can be generated by a policy function of a mobile network operator and can encrypted/signed by the policy function using a Home Network private key of the mobile network operator. When the application specific/partial URSP is provided to a UE, the signature can be verified using a Home Network public key provisioned for the UE such that the application specific/partial URSP can be decrypted and can be combined/integrated into the URSP that has been provided to the UE from the mobile network.

Accordingly, embodiments as provided herein through which an application specific/partial URSP can be provided to a UE for a particular application in addition to an operator-provided URSP can improve operations for 5G/nG mobile network architectures as UEs can install an operator-provided URSP that provides operator-specific policies, which can have a reduced size and therefore consume less non-volatile memory, and UEs can install application-specific URSP(s) that can depend on the application(s) operating via UEs. Furthermore, techniques as provided herein can reduce signaling load on a mobile network that may otherwise be consumed for pushing URSP policies/rules to UEs, potentially over multiple messages.

Referring to FIG. 1, FIG. 1 is a block diagram of a system 100 in which techniques may be implemented to facilitate providing an operator-encrypted/signed application specific/partial URSP to a user equipment (UE), according to an example embodiment. As shown in FIG. 1, system 100 may include a UE 101, a Radio Access Network (RAN) 110, a mobile network 120, and one or more data networks 160. RAN 110 may be implemented as any 3GPP 5G/next generation (nG) RAN and may include any number of gNodeBs (sometimes referred to as a 'gNBs'), such as a gNodeB 112. It is to be understood that any number of UEs may be present in system 100.

In at least one embodiment, mobile network 120 may be representative of a 5G mobile core (5GC) network or 5GS and may include an Access and Mobility Management Function (AMF) 122, a Session Management Function (SMF) 124, a Policy Control Function (PCF) 126, a User Plane Function (UPF) 128, a URSP Application Function (URSP-AF) 130, and a Domain Name System as an Authoritative Source (DNS-AS) server, referred to herein as DNS-AS 134. PCF 126 may provide different logical functionality via UE-PCF logic 126a and Session Management (SM)-PCF logic 126b. For the embodiment of FIG. 1, mobile network 120 may considered a Home Public Land Mobile Network (H-PLMN) for UE 101 such that UE 101 may not be considered to operating in a roaming scenario. In roaming scenarios, a UE is typically operated in a Visited PLMN (V-PLMN).

Mobile network 120 and network elements thereof can be considered to be managed/operated by a mobile network operator (MNO) and can be identified via PLMN identifier (ID) that can be represented in a Mobile Country Code (MCC)-Mobile Network Code (MNC), such as '315-011' [MCC-MNC], for example, or any other combination of a 3-digit MCC and a 2-digit or 3-digit MNC, depending on configuration/implementation of mobile network 120.

Also shown in FIG. 1, system 100 may also include a number of application functions (AFs), such as an AF 132-1 that may manage/communicate with an application that may be installed/operated on UE 101, such as an application 102-1 (also referred to herein as 'App102-1'), an AF 132-2 that may manage/communicate with another application that may be installed/operated on UE 101, such as an application 102-2 (also referred to herein as 'App102-2'), and an AF 132-3 that may manage/communicate with another application that may be installed/operated on UE 101, such as an application 102-3 (also referred to herein as 'App102-3'). In various embodiments, applications 102-1, 102-2, 102-3 may be implemented as any combination of applications/application logic that may be installed/operated on UE 101, such as social networking applications, shopping applications, audio/video streaming applications, enterprise applications, collaboration applications, weather applications, navigation applications, information applications, and/or any other applications now known or hereafter developed that may be installed/operated on a UE/wireless device/wired device/etc.

URSP-AF 130 may be implemented as an AF that may manage/distribute/provide application-specific/partial URSPs to one or more UEs, such as UE 101, that may register and establish one or more PDU sessions with mobile network 120. Accordingly, URSP-AF 130, which is considered to be part of the mobile network 120/H-PLMN is, thus, considered to be managed/operated by the mobile network operator managing/operating mobile network 120.

In contrast, AF 132-1, 132-2, and 132-3 can be considered to be managed/operated by one or more application service providers (ASPs). For example, AF 132-1 could be managed/operated by an ASP, AF 132-2 could be managed/operated by another ASP, and AF 132-3 could be managed/operated by yet another ASP. However, in another example, AF 132-1 and AF 132-3 could be managed/operated by the same ASP. Any combination of AFs could be managed by any combination of ASPs.

Although not illustrated in FIG. 1, it is to be understood that mobile network 120 may be implemented as any mobile core network and may also include any number/type of network functions/virtualized network functions that may be facilitated by a standards-based (e.g., 3GPP standards, etc.) mobile network core, such as any combination of one or more of a Unified Data Management (UDM) entity, Unified Data Repository (UDR), Network Repository Function (NRF), Network Slice Selection Function (NSSF), Home Subscriber Server (HSS), Mobility Management Entity (MME), Serving Gateway (SGW), Packet Data Network (PDN) Gateway (PGW), any Control and User Plane Separation (CUPS) functions, and/or the like in accordance with any mobile network standards.

In various embodiments, the data network(s) 160 of FIG. 1 may include any combination of the Internet, a gaming network, an IP IMS, an Ethernet data network (not shown), Ethernet switching system(s) (not shown), an enterprise network managed/operated by an enterprise entity, and/or the like. In some embodiments, any of AF 132-1, 132-2, 132-3 may be implemented in whole or in part via data network(s) 160.

RAN 110, via gNodeB 112, may interface with mobile network 120 via one or more wired and/or wireless interfaces. For example, gNodeB 112 may interface with AMF 122 and with UPF 128 in order to interact/communicate with any other elements of mobile network 120 and/or data network(s), as well as any of AFs 132-1, 132-2, and 132-3. RAN 110, via gNodeB 112, may also interface with UE 101 via one or more over-the-air Radio Frequency (RF) connections.

AMF 122 may further interface with SMF 124 and PCF 126. SMF 124 may also interface with UPF 128. Additionally, UPF 128 may also interface with data network(s) 160 and DNS-AS 134. PCF 126 may further interface with URSP-AF 130, AF 132-1, AF 132-2, and AF 132-3. In some embodiments, PCF 126 may interface with any combination of AF 132-1, AF 132-2, and/or AF 132-3 via a Network Exposure Function (NEF 136), depending on implementation.

The various interfaces shown in FIG. 1 are provided for illustrative purposes only and are not meant to limit the broad scope of the present disclosure. It is to be understood that network connectivity/interfaces among any of UE 101, RAN 110, mobile network 120 and data network(s) 160, and any elements/logic associated therewith, may be provided in any manner/configuration in accordance with 3GPP standards to facilitate operations, communications, etc. as discussed for embodiments herein.

Generally, RAN 110 may include any combination of one or more 3GPP 5G/nG gNodeB or gNB, such as gNodeB 112 and/or 3GPP 4G/LTE evolved node Bs (eNodeBs or eNBs), not shown, to facilitate network connectivity between UEs (e.g., UE 101) and mobile network 120. A gNodeB/eNodeB, such as gNodeB 112, may implement WWA (e.g., cellular) air interface and, in some instances also a WLA (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof, and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UEs, such as UE 101, may utilize to connect to RAN 110 for one or more PDU sessions (e.g., voice, video, data, gaming, combinations thereof, etc.) with a mobile core network, such as mobile network 120.

Generally, the coverage area of a radio node/access network radio such as an eNodeB, gNodeB, etc. is typically referred to as a 'cell' in which one or more UEs may attach to the radio node/access network radio that serves the coverage area/cell. In various embodiments, the coverage area of a radio node/access network radio can be identified through any combination of a Tracking Area Identifier (TAI), Routing Area Identifier (RAI), and/or the like as prescribed by 3GPP standards, etc. In various embodiments, gNodeB 112 can be identified using cell descriptors such as cell identifiers (IDs) including, but not limited to, Physical Cell Identifiers (PCIs), E-UTRAN Cell Global Identifiers (ECGIs), New Radio Cell Global Identifiers (NCGIs), and/or the like.

A UE, such as UE 101, may be associated with any user, subscriber, employee, client, customer, electronic device, etc. wishing to initiate a flow in system 100 and may be inclusive of any device that initiates a communication in system 100, such as a UE, a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. Thus, a UE, such as UE 101 may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes/access network radios of a RAN, such as RAN 110, for one or more sessions with a mobile core network, such as mobile network 120.

In addition to various operations discussed for techniques herein, an AMF, such as of AMF 122, may be considered a control plane element or control element of mobile network 120 and may facilitate access and mobility management control/services for one or more UEs for establishing connection with mobile network 120 (and/or one or more network slices of the mobile network, as applicable). In addition to various operations discussed for techniques herein, an SMF, such as SMF 124 may be considered another control plane element of mobile network 120 and may be responsible for UE 101 PDU session management (SM), with individual functions/services being supported on a per-session basis in order to facilitate data transfer(s) between a given UE and one or more data network(s) 160 via one or more UPFs. Generally, a UPF, such as UPF 128, may operate to provide packet routing and forwarding operations for user data traffic and may also perform a variety of functions such as packet inspection, traffic optimization, QoS, policy enforcement and user data traffic handling (e.g., to/from one or more data network(s) 160), and billing operations (e.g., accounting, etc.) for UE 101 PDU sessions.

Typically, a PCF, such as PCF 126, stores policy data for the mobile network 120 and can interact with one or more AFs in order to provide policy control services for a UE, such as UE 101 (e.g., to facilitate access control for UE 101, network selection, etc.) via UE-PCF logic 126a through UE 101 registration procedures performed with mobile network 120. PCF 126, via SM-PCF logic 126b, can also provide policy control services for a UE, such as UE 101, through UE 101 PDU session establishment procedures performed with mobile network 120. Although not shown, PCF 126 can also be configured with access management (AM)-PCF logic, which can also provide policy control services for a UE, such as UE 101, through UE 101 access and mobility management procedures performed with mobile network 120. In accordance with embodiments herein, PCF 126 can be enhanced to facilitate providing an encrypted/signed application specific/partial URSP to a UE, such as UE 101, as discussed in further detail herein, below. Generally, a DNS-AS, such as DNS-AS 134, may provide for resolving network services and/or applications that are "trusted" by mobile network 120/the mobile network operator.

Generally, during operation of system 100 in order to facilitate providing an encrypted/signed application specific (partial) URSP to UE 101, an AF/ASP can initiate a request to the mobile network 120, via UE-PCF logic 126a, to generate an application specific URSP by providing various application details/information to the mobile network as input parameters for a particular application managed/operated by the AF/ASP, such as application identifier/identifying information (AppId), OS type/version, application operating criteria (e.g., throughput criteria, minimum/maximum bit rate criteria, Quality of Service (QoS) criteria, etc.), and/or the like.

Based in the input parameters, the mobile network 120, via UE-PCF logic 126a, can generate the application specific (partial) URSP for the AppId, thus binding the particular application to a corresponding URSP rule including corresponding rule parameters, such as a precedence value and traffic descriptor/route selection parameters. In various embodiments, the UE-PCF logic 126a can be preconfigured with corresponding traffic descriptor/route selection parameters that can be matched to corresponding AppIds and/or any other combination of application details/information that can be utilized to generate a corresponding application specific URSP for a given application.

In accordance with embodiments herein, UE-PCF logic 126a can be configured with a Home Network private key (or a set of keys, each of which can be identified via a corresponding index/identifier) that can be utilized to sign/encrypt generated policy elements (application specific URSPs) in order to generate encrypted/signed application specific URSPs. Further in accordance with embodiments herein, generating an encrypted/signed application specific URSP can include generating an encrypted/signed application specific URSP rule, including, at least in part, an encrypted/signed traffic descriptor portion and an encrypted/signed route selection portion, and/or any other encrypted/signed information/portion (e.g., rule precedence) for the given encrypted/signed application specific URSP/URSP rule.

UE 101 can be configured with a number of Home Network public keys that can stored in the UE 101 (e.g., via any combination/variation of embedded Universal Integrated Circuit Card (eUICC) and/or embedded Subscriber Identity Module (eSIM), integrated SIM (iSIM), or universal SIM (USIM), referred to herein as ((e)(i)(U)SIM). Each Home Network public key can be identified via a corresponding key identifier value or index and can be correlated or otherwise stored in association with the PLMN ID for mobile network 120.

The UE-PCF logic 126a can generate a policy file or object (also referred to herein interchangeably as a "policy file/object," a "policy object," a "policy record," or a "URSP record") that includes the encrypted/signed application specific URSP and further includes a corresponding Home Network public key Identifier and the PLMN ID (for mobile network 120) as metadata fields included in the file/data object. The metadata fields can be unencrypted or may be encrypted in some instances.

Upon obtaining the policy file/object (utilizing various techniques discussed in further detail below and with reference to FIGS. 2A, 2B, and 2C), UE 101, can verify the signature on the encrypted/signed application specific URSP (policy element) by identifying a corresponding Home Network public key provisioned into the UE (e.g., eUICC/(e) (i) (U) SIM) using the Home Network public key Identifier and PLMN ID included in the metadata fields of the policy file/object and decrypting the encrypted/signed application specific URSP in order to obtain the (unencrypted) application specific URSP. In one embodiment, such a process for encrypting/decrypting an application specific URSP using a Home Network private/public key for integrity protection may be similar to the process in which such keys are used for Subscription Permanent Identifier (SUPI) concealment and other integrity protection processes as prescribed, for example, by 3GPP TS 33.501, involving a Subscription Concealed Identifier (SUCI) for a UE. For example, under the scheme provided via 3GPP TS 33.501, when a UE when sends its SUCI to a mobile network, the UE will include a Home Network Public Key Identifier that identifies which Public Key was used to generate the protection scheme output. Similar application of a Home Network Public Key can be utilized for embodiments herein involving encrypting/decrypting an application specific URSP provided to a UE.

Upon obtaining the unencrypted application specific URSP for the application, the UE 101 can integrate the application specific URSP, or more specifically, the URSP rule for the particular application contained in the application specific URSP, into an operator-centric URSP provided to the UE 101 through registration with the mobile network. The UE 101 can then utilize the application specific URSP rule for the particular application for communications involving the application.

In accordance with embodiments herein, at least three techniques may be utilized to facilitate distributing an encrypted/signed application specific URSP to a UE, such as UE 101, including: bundling an encrypted/signed application specific URSP with an application that can be obtained by a UE through installing the application; delivering an encrypted/signed application specific URSP to an AF/ASP for delivery to a UE; and/or making an encrypted/signed application specific URSP retrievable using a DNS-AS infrastructure (e.g., involving DNS-AS 134) or a Hypertext Transfer Protocol (HTTP) or HTTP Secure (HTTPS) infrastructure.

For the "bundling" technique, an application or installation package for the application can include two components, the application itself and a policy file/object that includes an encrypted/signed application specific URSP for the application and metadata fields identifying a Home Network public key Identifier and PLMN ID (for mobile network 120). The encrypted/signed application specific URSP can be generated to be specific to the OS type/version for which the application is designed and can be signed by the mobile network operator (e.g., by UE-PCF logic 126a) using a Home Network private key for the mobile network 120. Upon installing the application by a UE, such as UE 101 that has obtained the application package, the signature on the encrypted/signed application specific URSP can be verified the UE 101 by retrieving/identifying the Home Network public key Identifier and PLMN ID included as part of the metadata fields and determining that the encrypted/signed application specific URSP can be successfully decrypted to obtain the unencrypted application specific URSP. Upon successful verification/decryption, the application specific URSP, or more specifically, the application specific URSP rule contained therein is installed into the eUICC/(e)(i)(U)SIM for the UE 101 and, if applicable, integrated into any existing URSP provided to the UE 101 through registration with mobile network 120.

For the technique in which an encrypted/signed application specific URSP is provided to a UE, such as UE 101, by an ASP/AF, the policy file/object including the encrypted/signed application specific URSP and the metadata fields specifying a Home Network public key Identifier and PLMN ID (for mobile network 120) is provided to the UE. In various embodiments, the policy file/object can be provided to the UE 101 by the UE 101 downloading the policy file/object from an internet location that can be shared with the UE 101 via a Uniform Resource Locator (URL) shared with the UE over any of a Short Message Service (SMS), from a service portal for the ASP, from a service portal for an application store (which may or may not be provided by the ASP, for example, which could be OS specific, etc.), and/or using any other delivery technique now known or hereafter developed. Similar to the previous technique, the signature on the encrypted/signed application specific URSP can be verified by retrieving/identifying the Home Network public key Identifier and PLMN ID included as part of the metadata fields and determining that the encrypted/signed application specific URSP can be successfully decrypted to obtain the unencrypted application specific URSP. Upon successful verification/decryption, the application specific URSP, or more specifically, the application specific URSP rule contained therein is installed into the eUICC/(e) (i) (U) SIM for the UE 101 and, if applicable, integrated into any existing URSP provided to the UE 101 through registration with mobile network 120. Thus, integrity verification for the application specific URSP can also be provided for through this additional technique. In some instances, the application itself can also be downloaded and installed using this additional technique in a similar manner as discussed for the previous technique.

For the technique involving a DNS-AS infrastructure, including DNS-AS 134, a UE, such as UE 101, can be provided, through registration with mobile network 120, a DNS link and name space for fetching the policy files/objects for any application that may be installed on the UE 101. The UE 101 can formulate a DNS query to DNS-AS 134 by using an OS identifier (ID) and application identifier (AppId) for a given application for which an application specific URSP is desired, such as, for example, "www.exampleoperator.com/URSP-Policy/AppId102-1/OSId2/" (e.g., for App102-1). In response to a DNS query for a particular application, DNS-AS 134 will deliver a text (TXT) record that includes an encrypted/signed URSP policy for the particular application along with metadata elements identifying a Home Network public key Identifier and PLMN ID (for mobile network 120). Similar to the previous techniques, the signature on the encrypted/signed application specific URSP can verified by using the Home Network public key Identifier and PLMN ID and determining that the encrypted/signed application specific URSP can be successfully decrypted to obtain the unencrypted application specific URSP. Upon successful verification/decryption, the application specific URSP, or more specifically, the application specific URSP rule contained therein is installed into the eUICC/(e)(i)(U)SIM for the UE 101 and, if applicable, integrated into any existing URSP provided to the UE 101 through registration with mobile network 120. Thus, integrity verification for the application specific URSP can also be provided for through this additional technique.

In some embodiments, an HTTP/HTTPS infrastructure can be used for obtaining an encrypted/signed application specific URSP and corresponding metadata.

Consider various additional operational features that may be associated with such techniques, as discussed in further detail with reference to FIGS. 2A, 2B, and 2C, which are a message sequence diagram illustrating a call flow 200 associated with providing an operator encrypted/signed application specific/partial URSP to a UE, according to an example embodiment. FIGS. 2A, 2B, and 2C illustrate UE 101, URSP-AF 130, AF 132-1 (associated with App102-1), AF 132-2 (associated with App102-2), AF 132-3 (associated with App102-3), and DNS-AS 134. For purposes of brevity only, mobile network 120 is generally shown in FIGS. 2A, 2B, and 2C, however, various operations/interactions shown in FIGS. 2A, 2B, and 2C may be discussed with reference to various network elements of mobile network 120, as shown in FIG. 1.

As shown at 202, consider that each corresponding ASP/AF 132-1, 132-2, and 132-3 has a corresponding Service Level Agreement (SLA) with the mobile network operator of mobile network 120 regarding a network slice, DNN, QoS, and/or other URSP attributes that are to be met/provided for each corresponding application 102-1 (App102-1), application 102-2 (App102-2), and application 102-3 (App102-3). At 204-1, consider that AF 132-1 sends application details for application 102-1 to the mobile network 120, in particular, to PCF 126/UE-PCF logic 126a. At 204-2, consider that AF 132-2 sends application details for application 102-2 to the mobile network 120, in particular, to PCF 126/UE-PCF logic 126a. At 204-3, consider that AF 132-2 sends application details for application 102-3 to the mobile network 120, in particular, to PCF 126/UE-PCF logic 126a.

In various embodiments, application details sent to PCF 126/UE-PCF logic 126a from a given AF for a particular application can include any details/information such as application identifier/identifying information (AppId), OS type/version, application operating criteria (e.g., throughput criteria, minimum/maximum bit rate criteria, Quality of Service (QoS) criteria, etc.), and/or the like.

At 206, consider that PCF 126/UE-PCF logic 126a constructs URSP rules for an application specific URSP for each corresponding application 102-1, 102-2, and 102-3, based on the AppId, network slice information, DNN, and/or any other URSP attributes/rules that may be configured/provisioned for mobile network 120 for each corresponding application. Each URSP rule constructed for each application specific URSP created for each corresponding application 102-1, 102-2, and 102-3 can include, at least in part, a traffic descriptor portion (sometimes referred to as a traffic selector portion) including traffic descriptor rules (e.g., AppId, IP descriptors, domain descriptors, DNN, etc. as may be prescribed by 3GPP standards) and a route selection portion including route selection rules (e.g., SSC mode, network slice information, access type, etc. as may be prescribed by 3GPP standards) for each corresponding application. For each URSP rule (or, stated differently, each set of traffic descriptor/route selection rules) for each application specific URSP created for each application, the UE-PCF logic 126*a* can generate an encrypted/signed application specific URSP using a Home Network public key for mobile network 120. It is to be understood that generating an encrypted/signed application specific URSP can include generating an encrypted/signed URSP rule (including a set of traffic descriptor/route selection rules) for a given application specific URSP.

Further at 206, consider that the UE-PCF logic 126*a* can generate, for each corresponding application, a corresponding policy file or policy object that includes each encrypted/signed application specific URSP (or URSP rule) for each corresponding application. The UE-PCF logic 126*a* can include in the policy file or object one or more metadata fields, such as a metadata field identifying a Home Network public key Identifier and a metadata field identifying the PLMN ID for mobile network 120, which UE 101 can utilize to identify a Home Network public key in order to verify the signature and decrypt a corresponding encrypted/signed application specific URSP (or URSP rule) for a corresponding application.

Figure 2A:
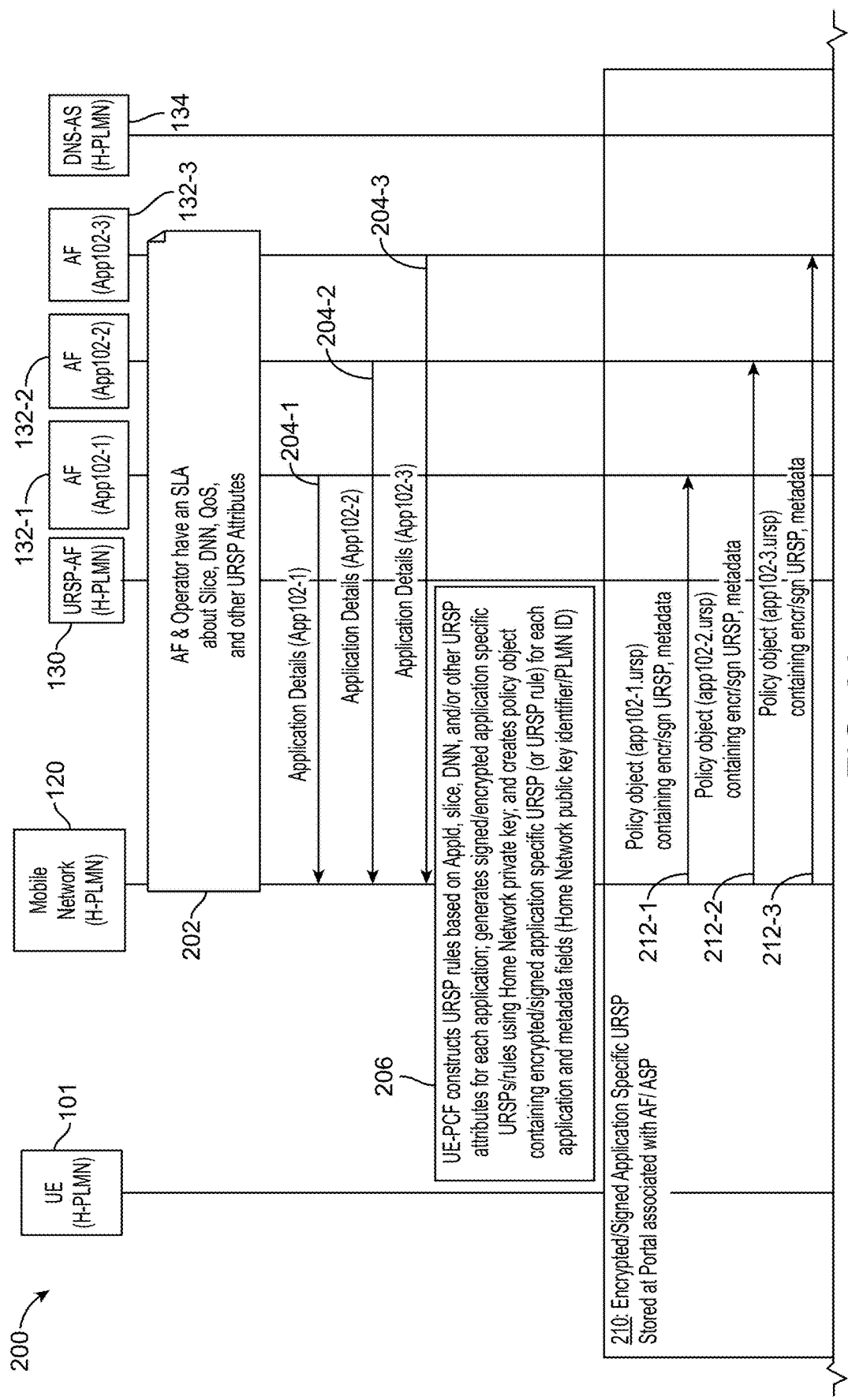
FIGS. 2A, 2B, and 2C are a message sequence diagram illustrating a call flow associated with providing an operator signed partial URSP to a UE, according to an example embodiment.
Figure 2B:
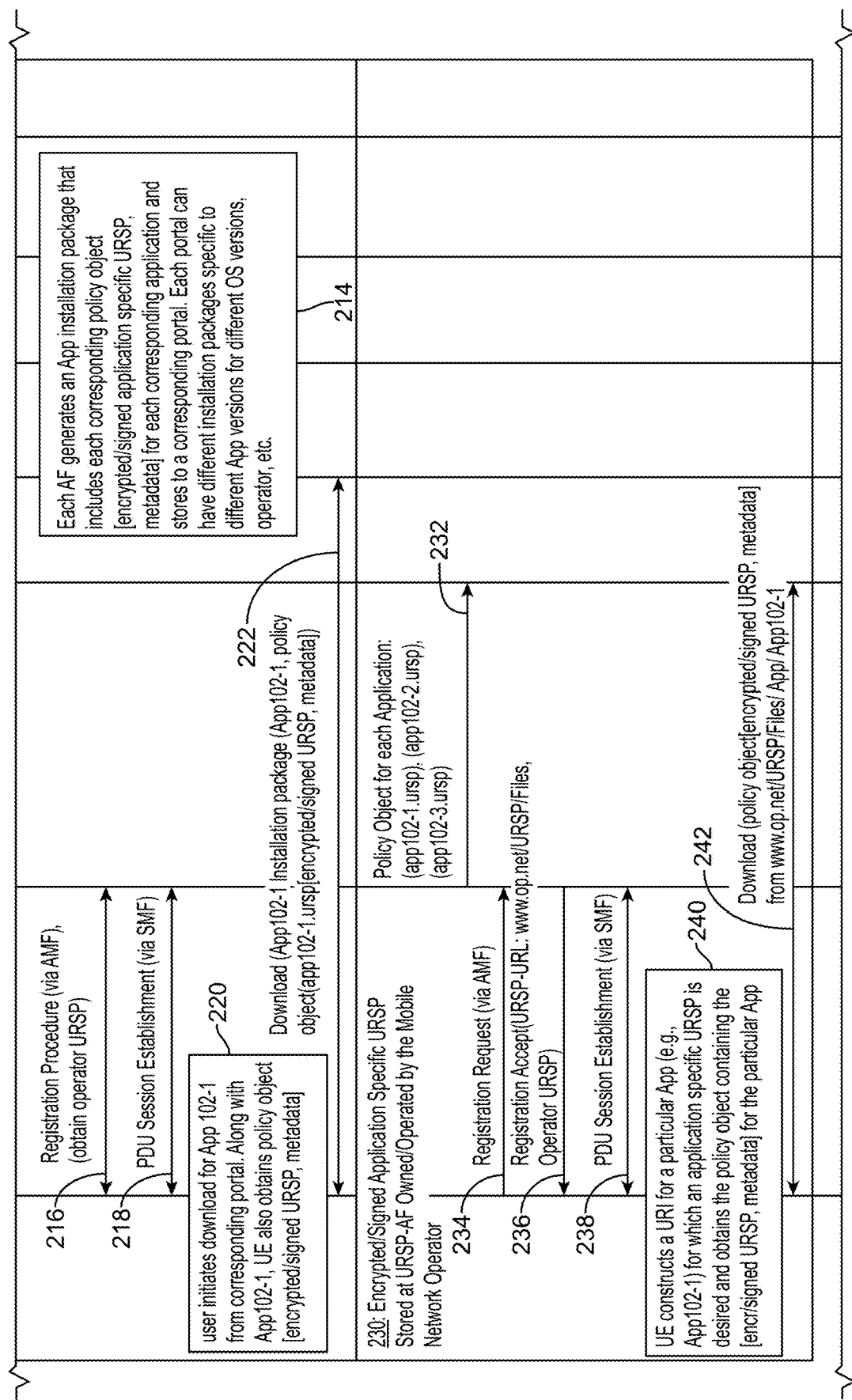
Figure 2C:
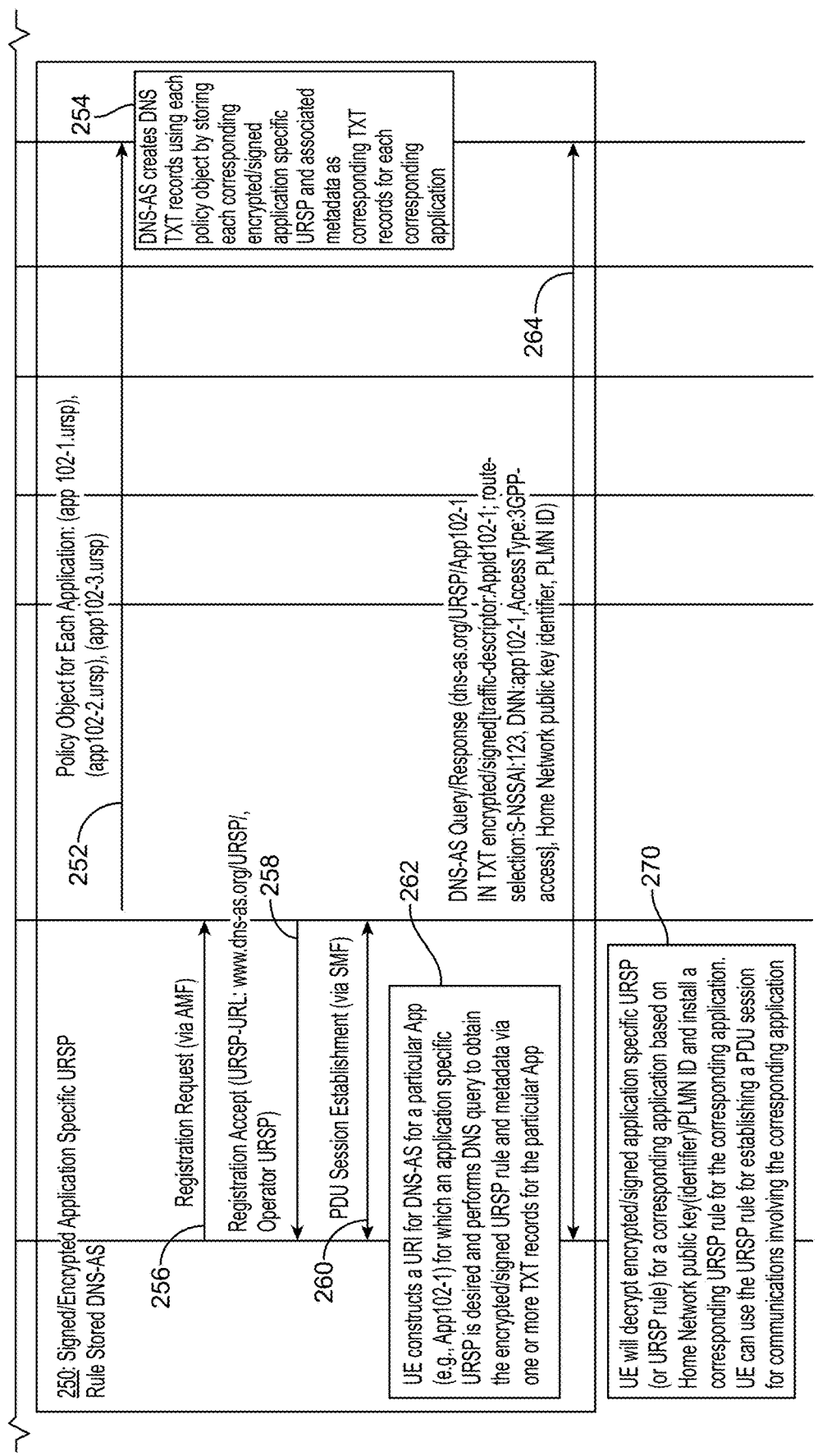

As discussed herein with reference to FIGS. 2A, 2B, and 2C, the policy file or policy object including the encrypted/signed application specific URSP (or URSP rule) generated for application 102-1 and corresponding metadata or metadata fields (Home Network public key Identifier and PLMN ID) can be labeled "app102-1.ursp," the policy file or policy object including the encrypted/signed application specific URSP (or URSP rule) generated for application 102-2 and corresponding metadata or metadata fields (Home Network public key Identifier and PLMN ID) can be labeled "app102-2.ursp," and the policy file or policy object including the encrypted/signed application specific URSP (or URSP rule) generated for application 102-3 and corresponding metadata or metadata fields (Home Network public key Identifier and PLMN ID) can be labeled "app102-3.ursp."

Various techniques for providing an encrypted/signed application specific URSP (or URSP rule) to UE 101 are discussed in further detail herein below. For example, operations 210 illustrate example details for an embodiment in which each encrypted/signed application specific URSP (and corresponding metadata) for each corresponding application 102-1, 102-2, and 102-3 can be stored at an internet portal via an application installation package associated with each corresponding ASP/AF 132-1, 132-2, and 132-3 that manages/communicates with each application that may be installed/operated via UE 101. In another example, operations 230 illustrate example details for an embodiment in which each encrypted/signed application specific URSP (and corresponding metadata) for each corresponding application 102-1, 102-2, and 102-3 can be stored at URSP-AF 130 that is owned/operated by the mobile network operator via mobile network 120. In yet another example, operations 250 illustrate example details for an embodiment in which each encrypted/signed application specific URSP rule (and corresponding metadata) for each corresponding application 102-1, 102-2, and 102-3 can be stored at the DNS-AS 134.

In some instances, when a UE downloads an application via a data network, such as from an application store, internet portal, or directly from an ASP, an encrypted/signed application specific URSP can be included as part of the installation package that includes the application. For example, consider operations 210, as shown in FIG. 2A, in which the mobile network 120, via PCF 126/UE-PCF logic 126*a*, as shown at 212-1, can send the policy object (app102-1.ursp) created for application 102-1 to AF 132-1 that includes the encrypted/signed application specific URSP for application 102-1 and corresponding metadata fields. At 212-2, the mobile network 120, via PCF 126/UE-PCF logic 126*a*, can send the policy object (app102-2.ursp) created for application 102-2 to AF 132-2 that includes the encrypted/signed application specific URSP for application 102-2 and corresponding metadata fields. Further, at 212-3, the mobile network 120, via PCF 126/UE-PCF logic 126*a*, can send the policy object (app102-3.ursp) created for application 102-3 to AF 132-3 that includes the encrypted/signed application specific URSP for application 102-3 and corresponding metadata fields.

As collectively shown at 214, each corresponding AF 132-1, 132-2, and 132-3 can generate an application installation package for each corresponding application 102-1, 102-2, and 102-3 that includes each corresponding policy object "app102-1.ursp," "app102-2.ursp," and "app102-3.ursp." as well as each corresponding application 102-1, 102-2, and 102-3 that can be installed for UE 101, and stores each application installation package to a corresponding internet portal associated with each corresponding AF 132-1, 132-2, and 132-3. It is to be understood that each corresponding internet portal associated with each corresponding AF/application 132-1/102-1, AF/application 132-2/102-2, and AF/application 132-3/102-3 can have different installation packages that may be specific to different application versions for different OS types/versions, different mobile network operators, and/or any other variations that may impact application operations/installation/etc. Further, it is to be understood that each installation package can include any executables, code, drivers, etc. that may facilitate installation of a given application at a given UE, such as UE 101.

At 216, consider that UE 101 initiates a registration procedure with mobile network 120, in particular, via AMF 122, as prescribed by 3GPP standards (e.g., at least per 3GPP TS 23.501). Through the registration procedure at 216, UE 101 can obtain operator-centric (non-application specific) URSP/URSP rules via AMF 122/PCF 126/UE-PCF logic 126*a*, as prescribed by 3GPP standards. At 218, consider that UE 101 performs PDU session establishment with mobile network 120, in particular, via SMF 124 as prescribed by 3GPP standards in order to establish a default PDU session with mobile network 120.

At 220 and 222, consider that a user of UE 101 initiates a download for application 102-1 (App102-1) from the corresponding internet portal provided via AF 132-1 through which UE 101 downloads an application 102-1 installation package that includes application 102-1 and the policy object for application 102-1 (app102-1.ursp) that includes the corresponding encrypted/signed application specific URSP for application 102-1 (as generated by PCF 126/126*a*, as discussed at 206) and corresponding metadata (Home Network public key Identifier and PLMN ID for mobile network 120). Continuing to 270, as shown in FIG. 2B, UE 101 can verify the signature/integrity of the encrypted/signed application specific URSP by identifying a Home Network public key corresponding to the identifier (value) and PLMN ID in order to decrypt the encrypted/signed application specific URSP to obtain the unencrypted application specific URSP and URSP rule for application 102-1 contained therein. The UE 101 can install/integrate the URSP rule into any existing URSP/URSP rule(s) already provisioned for the UE. The UE can utilize the URSP rule for application 102-1 in order to establish a PDU session for network communications via mobile network 120 involving the corresponding application 102-1 (e.g., network communications to/from UE 101 and AF 132-1 via mobile network 120 for application 102-1, to/from UE 102 and one or more data networks 160 via mobile network 120/UPF 128 for application 102-1, etc.).

Returning to FIG. 2A, consider other example operations 230 that illustrate example details for an embodiment in which each encrypted/signed application specific URSP (and corresponding metadata) for each corresponding application 102-1, 102-2, and 102-3 can be stored at URSP-AF 130 that is owned/operated by the mobile network operator via mobile network 120. For example, at 232, consider that mobile network 120, via PCF 126/UE-PCF logic 126*a*, sends each corresponding policy object, "app102-1.ursp," "app102-2.ursp," and "app102-3.ursp" for each corresponding application 102-1, 102-2, and 102-3 to URSP-AF 130. In some embodiments, each policy object can be combined into a single file and sent to URSP-AF 130. In some embodiments, each policy object can be sent to URSP-AF 130 separately.

At 234, consider that UE 101 initiates a registration procedure with mobile network 120, in particular, via AMF 122, as prescribed by 3GPP standards (e.g., at least per 3GPP TS 23.501) by sending a registration request message to mobile network 120/AMF 122. At 236, in accordance with embodiments herein, the mobile network 120/AMF 122 can send a URL to UE 101 via a registration accept message that indicates a network location associated with URSP-AF 130 (e.g., "URSP-URL: www.op.net/URSP/Files") through which UE 101 can download one or more application specific URSPs/URSP rules for one or more application(s) that may be installed on UE 101. Through the registration accept message at 236, UE 101 can also obtain an operator-centric (non-application specific) URSP/URSP rules via AMF 122/PCF 126/UE-PCF logic 126*a*, as prescribed by 3GPP standards. At 238, consider that UE 101 performs PDU session establishment with mobile network 120, in particular, via SMF 124 as prescribed by 3GPP standards in order to establish a default PDU session with mobile network 120.

At 240, consider that UE 101 constructs a Uniform Resource Identifier (URI) for a particular application, such as application 102-1 installed on UE 101, for which UE 101 seeks to obtain an application specific URSP/URSP rule for the application, such as "www.op.net/URSP/Files/App/App102-1," and, as shown at 242, initiates a download of the policy object (app102-1.ursp) for the corresponding application 102-1 from URSP-AF 130 using the constructed URI in which the policy object includes the corresponding encrypted/signed application specific URSP for application 102-1 (as generated by PCF 126/126*a*, as discussed at 206) and corresponding metadata (Home Network public key Identifier and PLMN ID for mobile network 120). Continuing to 270, as shown in FIG. 2B and as discussed for the previous example operations, UE 101 can verify the signature/integrity of the encrypted/signed application specific URSP by identifying a Home Network public key corresponding to the Identifier value and PLMN ID in order to decrypt the encrypted/signed application specific URSP to obtain the unencrypted application specific URSP and URSP rule for application 102-1 contained therein. The UE 101 can install/integrate the URSP rule into any existing URSP/URSP rule(s) already provisioned for the UE. The UE can utilize the URSP rule for application 102-1 in order to establish a PDU session for network communications via mobile network 120 involving the corresponding application 102-1 (e.g., network communications to/from UE 101 and AF 132-1 via mobile network 120 for application 102-1, to/from UE 102 and one or more data networks 160 via mobile network 120/UPF 128 for application 102-1, etc.).

In addition to example operations 210 and 230 as discussed for FIG. 2A, consider yet other example operations, as shown at 250 in FIG. 2B, which illustrate example details for an embodiment in which each encrypted/signed application specific URSP rule (and corresponding metadata) for each corresponding application 102-1, 102-2, and 102-3 can be stored at the DNS-AS 134. For operations 250, consider at 252, that the mobile network 120, via PCF 126/UE-PCF logic 126*a*, sends each corresponding policy object, "app102-1.ursp," "app102-2.ursp," and "app102-3.ursp" for each corresponding application 102-1, 102-2, and 102-3 to DNS-AS 134.

In accordance with embodiments herein, DNS-AS 134, as shown at 254, can store each corresponding encrypted/signed application specific URSP rule, including the encrypted/signed traffic descriptor portion and route selection portion, along with corresponding metadata in a corresponding DNS text (TXT) record that is associated with each corresponding application 102-1, 102-2, and 102-3.

At 256, consider that UE 101 initiates a registration procedure with mobile network 120, in particular, via AMF 122, as prescribed by 3GPP standards (e.g., at least per 3GPP TS 23.501) by sending a registration request message to mobile network 120/AMF 122. At 258, in accordance with embodiments herein, the mobile network 120/AMF 122 can send a URL to UE 101 via a registration accept message that indicates a network location associated with DNS-AS 134 (e.g., "URSP-URL: www.dns-as.org/URSP/") through which UE 101 can download one or more application specific URSPs/URSP rules for one or more application(s) that may be installed on UE 101. Through the registration accept message at 258, UE 101 can also obtain operator-centric (non-application specific) URSP/URSP rules via AMF 122/PCF 126/UE-PCF logic 126*a*, as prescribed by 3GPP standards. At 260, consider that UE 101 performs PDU session establishment with mobile network 120, in particular, via SMF 124 as prescribed by 3GPP standards in order to establish a default PDU session with mobile network 120.

At 262, consider that UE 101 constructs a URI for a particular application, such as application 102-1 installed on UE 101, for which UE 101 seeks to obtain an application specific URSP rule for the application 102-1, such as "dns-as.org/URSP/App102-1" and, as shown at 264, initiates a DNS query/response procedure using the URI through which DNS-AS provides to UE 101 a DNS TXT record containing the encrypted/signed application specific URSP rule for application 102-1 (e.g., [traffic-descriptor: AppId102-1; route-selection: S-NSSAI:123, DNN:app102-1, Access-Type:3gpp-access]), along with the Home Network public key Identifier and PLMN ID for mobile network 120 as included in the DNS TXT record created in DNS-AS 134. Similar to the other techniques as discussed above, at 270, UE 101 can verify the signature/integrity of the encrypted/signed application specific URSP rule by identifying a Home Network public key corresponding to the Identifier value and PLMN ID in order to decrypt the encrypted/signed application specific URSP rule to obtain the unencrypted application specific URSP rule for application 102-1. The UE 101 can install/integrate the URSP rule into any existing URSP/URSP rule(s) already provisioned for the UE. The UE can utilize the URSP rule for application 102-1 in order to establish a PDU session for network communications via mobile network 120 involving the corresponding application 102-1 (e.g., network communications to/from UE 101 and AF 132-1 via mobile network 120 for application 102-1, to/from UE-102 101 and one or more data networks 160 via mobile network 120/UPF 128 for application 102-1, etc.).

Accordingly, FIGS. 2A, 2B, and 2C illustrate different techniques through which an encrypted/signed application specific URSP (or URSP rule) for each of one or more application(s) can be provided to a UE by different network elements (e.g., an AF operated by a given ASP, a URSP-AF operated by a mobile network operator, and/or a DNS-AS operated by a mobile network operated) through different delivery mechanisms that, advantageously, can support different mobile network implementations, operating environments, etc. Although example operations discussed for FIGS. 2A, 2B, and 2C are discussed with reference to an encrypted/signed application specific URSP (or URSP rule) for application 102-1 being provided to UE 101, it is to be understood that such operations may be utilized for any of applications 102-2 and/or 102-3.

Figure 3:
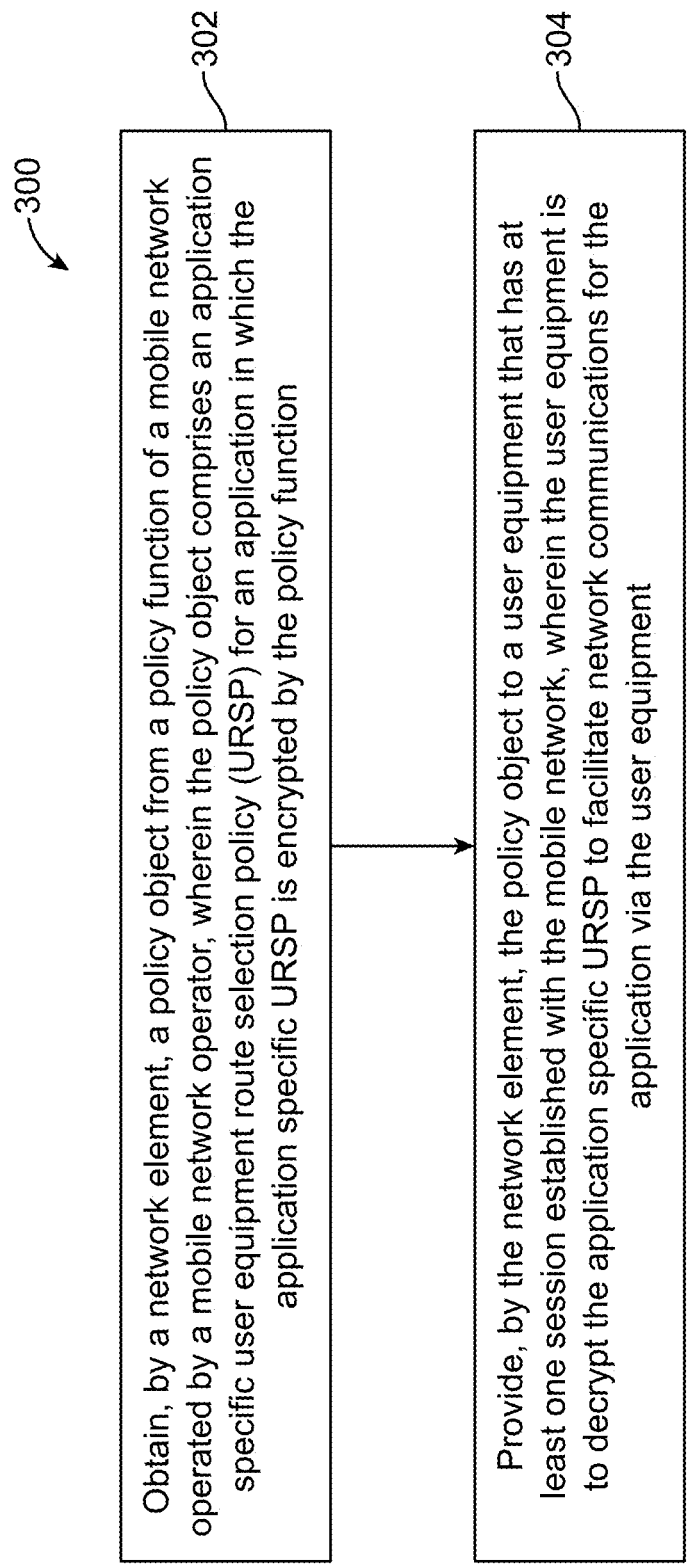
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, by a network element, such as any of AF 132-1, AF 132-2, AF 132-3, URSP-AF 130, or DNS-AS 134 shown in FIG. 1, according to various example embodiments.

At 302, the method may include obtaining, by a network element, a policy object from a policy function (e.g., PCF 126/UE-PCF logic 126a) of a mobile network operated by a mobile network operator, wherein the policy object comprises an application specific user equipment route selection policy (URSP) for an application in which the application specific URSP is encrypted by the policy function. As discussed for embodiments herein, an encrypted/signed application specific URSP can include a URSP rule that includes, at least in part, a traffic descriptor portion and a route selection portion. In some instances, the network element can obtain, via the policy object, an encrypted/signed application specific URSP rule, including, at least in part, an encrypted/signed traffic descriptor portion and an encrypted/signed route selection portion, and/or any other encrypted/signed information/portion (e.g., rule precedence) for the given URSP/URSP rule.

In at least one embodiment, the application specific URSP can be encrypted by the policy function using a private key (e.g., a Home Network private key) of the mobile network operator. In at least one embodiment, the policy object can further include a public key identifier value (e.g., Home Network public key Identifier) and a PLMN ID for the mobile network. In at least one embodiment, the public key identifier value and the PLMN ID can be included as unencrypted metadata fields within the policy object.

At 304, the method can include providing, by the network element, the policy object to a user equipment that has at least one session established with the mobile network, wherein the user equipment is to decrypt the application specific URSP to facilitate network communications for the application via the user equipment. In at least one embodiment, the user equipment is to determine a public key based on the public key identifier value and the PLMN identifier in order to decrypt the application specific URSP using the public key.

In at least one embodiment, the network element is an application function operated by an application service provider (e.g., any of AF 132-1, AF 132-2, or AF 132-3) in which the providing includes the policy object and the application being downloaded by the user equipment via an internet portal operated by the application service provider. In at least one embodiment, the network element is an application function operated by the mobile network operator (e.g., URSP-AF 130) in which the providing includes the policy object being downloaded by the user equipment via the application function. In at least one embodiment, the network element is a DNS server operated by the mobile network operator (e.g., DNS-AS 134 or any other DNS server that may be operated by a mobile network operator) in which the providing includes an encrypted traffic descriptor portion and an encrypted route selection portion of the application specific URSP being sent to the user equipment via one or more DNS text records following a DNS query from the user equipment that is associated with the application, wherein the traffic descriptor portion and the route selection portion are encrypted.

Accordingly, techniques herein facilitate providing an operator-encrypted/signed application specific URSP (or URSP rule) to a user equipment using different network elements and/or different distribution techniques.

Figure 4:
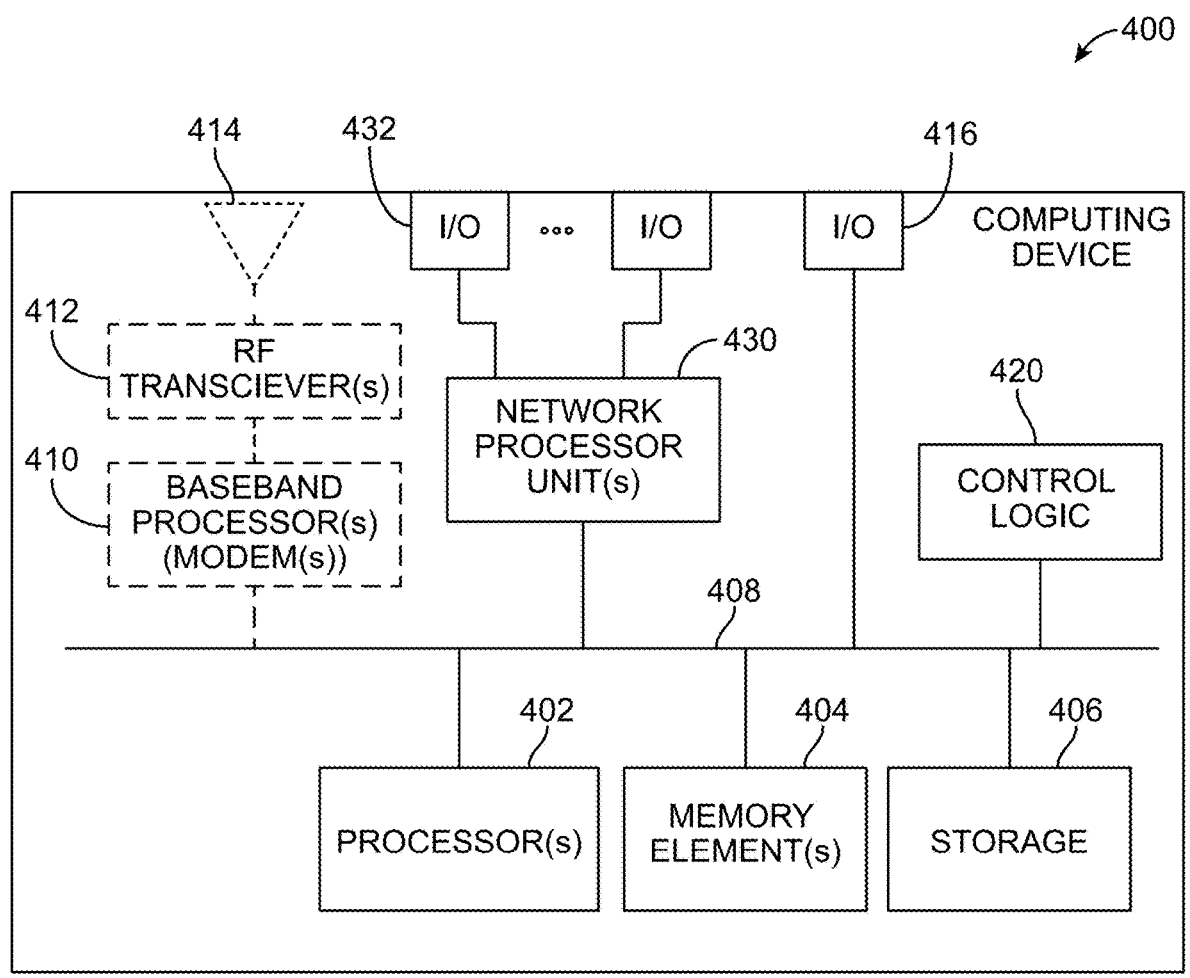
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein in order to perform operations of the various techniques discussed herein, such as, for example, any of UE 101, AMF 122, SMF 124, PCF 126, UPF 128, gNodeB 112, URSP-AF 130, AF 132-1, AF 132-2, AF 132-3, DNS-AS 134, and/or any other element discussed for embodiments herein.

In at least one embodiment, computing device 400 may be any apparatus that may include one or more processor(s) 402, one or more memory element(s) 404, storage 406, a bus 408, one or more I/O interface(s) 416, control logic 420, one or more one network processor unit(s) 430 and one or more network I/O interface(s) 432. In various embodiments, instructions associated with logic for computing device 400 can overlap in any manner and are not limited to the specific allocation of instructions and/or operations described herein.

For embodiments in which computing device 400 may be implemented as a UE or a radio node/access network radio (e.g., gNodeB, etc.), computing device 400 may further include at least one baseband processor or modem 410, one or more radio RF transceiver(s) 412, and one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that are configured for computing device 400. In at least one embodiment, bus 408 is implemented as a fast kernel-hosted interconnect, potentially using shared memory between processes (e.g., logic), which can enable efficient communication paths between the processes.

Network processor unit(s) 430 may enable communication between computing device 400 and other systems, devices, or entities, via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 400 and other systems, devices, or entities to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that are connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still other instances, external devices can be a mechanism to display data to a user, such as, for example, a computer monitor, a display screen. In some embodiments, the computing device 400 supports a display having touch-screen display capabilities.

For embodiments in which computing device 400 is implemented as a UE or a radio node/access network radio (e.g., gNodeB, etc.), the RF transceiver(s) 412 may perform RF transmission and RF reception of wireless signals via antenna(s)/antenna array(s) 414, and the baseband processor (modem) 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device 400; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420 of computing device 400) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 404 of computing device 400) and/or storage (e.g., storage 406 of computing device 400) can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a network element, a policy object from a policy function of a mobile network operated by a mobile network operator, wherein the policy object comprises an application specific user equipment route selection policy (URSP) for an application in which the application specific URSP is encrypted by the policy function; and providing, by the network element, the policy object to a user equipment that has at least one session established with the mobile network, wherein the user equipment is to decrypt the application specific URSP to facilitate network communications for the application via the user equipment.

In one instance, the application specific URSP is encrypted by the policy function using a private key of the mobile network operator. The policy object further can further include a public key identifier value and a Public Land Mobile Network (PLMN) identifier for the mobile network. The user equipment is to determine a public key based on the public key identifier value and the PLMN identifier in order to decrypt the application specific URSP using the public key. The user equipment can be provided a non-application specific URSP from the mobile network in which the non-application specific URSP is unencrypted.

The application specific URSP can include a traffic descriptor portion comprising identifying information for the application; and a route selection portion comprising a slice identifier for a network slice that is to be utilized for the application, a data network name that is to be utilized for the application, and a radio access type that is to be utilized for the application.

In one instance, the network element is an application function operated by an application service provider and the providing includes the policy object and the application being downloaded by the user equipment via an internet portal operated by the application service provider. In one instance, the network element is an application function operated by the mobile network operator and the providing includes the policy object being downloaded by the user equipment via the application function. In one instance, the network element is a Domain Name System (DNS) server operated by the mobile network operator and the providing includes an encrypted traffic descriptor portion and an encrypted route selection portion of the application specific URSP being sent to the user equipment via one or more DNS text records following a DNS query from the user equipment that is associated with the application.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a network element, a policy object from a policy function of a mobile network operated by a mobile network operator, wherein the policy object comprises an application specific user equipment route selection policy (URSP) for an application in which the application specific URSP is encrypted by the policy function; and
   providing, by the network element, the policy object to a user equipment that has at least one session established with the mobile network, wherein the user equipment is to decrypt the application specific URSP to facilitate network communications for the application via the user equipment, and wherein the network element is an application function operated by an application service provider or is an application function or a Domain Name System (DNS) server operated by the mobile network operator.

2. The method of claim 1, wherein the application specific URSP is encrypted by the policy function using a private key of the mobile network operator.

3. The method of claim 1, wherein the policy object further comprises a public key identifier value and a Public Land Mobile Network (PLMN) identifier for the mobile network.

4. The method of claim 3, wherein the user equipment is to determine a public key based on the public key identifier value and the PLMN identifier in order to decrypt the application specific URSP using the public key.

5. The method of claim 1, wherein the user equipment is provided a non-application specific URSP from the mobile network in which the non-application specific URSP is unencrypted.

6. The method of claim 1, wherein the application specific URSP comprises:
   a traffic descriptor portion comprising identifying information for the application; and
   a route selection portion comprising a slice identifier for a network slice that is to be utilized for the application, a data network name that is to be utilized for the application, and a radio access type that is to be utilized for the application.

7. The method of claim 1, wherein when the network element is the application function operated by the application service provider, the providing includes the policy object and the application being downloaded by the user equipment via an internet portal operated by the application service provider.

8. The method of claim 1, wherein when the network element is the application function operated by the mobile network operator, the providing includes the policy object being downloaded by the user equipment via the application function.

9. The method of claim 1, wherein when the network element is the DNS server operated by the mobile network operator, the providing includes an encrypted traffic descriptor portion and an encrypted route selection portion of the application specific URSP being sent to the user equipment via one or more DNS text records following a DNS query from the user equipment that is associated with the application.

10. One or more non-transitory computer readable storage media encoded with instructions that, when executed by a processor, cause the processor to perform operations, comprising:
obtaining, by a network element, a policy object from a policy function of a mobile network operated by a mobile network operator, wherein the policy object comprises an application specific user equipment route selection policy (URSP) for an application in which the application specific URSP is encrypted by the policy function; and
providing, by the network element, the policy object to a user equipment that has at least one session established with the mobile network, wherein the user equipment is to decrypt the application specific URSP to facilitate network communications for the application via the user equipment, and wherein the network element is an application function operated by an application service provider or is an application function or a Domain Name System (DNS) server operated by the mobile network operator.

11. The media of claim 10, wherein the application specific URSP is encrypted by the policy function using a private key of the mobile network operator.

12. The media of claim 10, wherein the policy object further comprises a public key identifier value and a Public Land Mobile Network (PLMN) identifier for the mobile network.

13. The media of claim 12, wherein the user equipment is to determine a public key based on the public key identifier value and the PLMN identifier in order to decrypt the application specific URSP using the public key.

14. The media of claim 10, wherein when the network element is the application function operated by the application service provider, the providing includes the policy object and the application being downloaded by the user equipment via an internet portal operated by the application service provider.

15. The media of claim 10, wherein when the network element is the application function operated by the mobile network operator, the providing includes the policy object being downloaded by the user equipment via the application function.

16. The media of claim 10, wherein when the network element is the DNS server operated by the mobile network operator, the providing includes an encrypted traffic descriptor portion and an encrypted route selection portion of the application specific URSP being sent to the user equipment via one or more DNS text records following a DNS query from the user equipment that is associated with the application.

17. A network element comprising:
at least one memory element for storing data; and
at least one processor for executing instructions associated with the data, wherein executing the instructions causes the network element to perform operations, comprising:
obtaining a policy object from a policy function of a mobile network operated by a mobile network operator, wherein the policy object comprises an application specific user equipment route selection policy (URSP) for an application in which the application specific URSP is encrypted by the policy function; and
providing the policy object to a user equipment that has at least one session established with the mobile network, wherein the user equipment is to decrypt the application specific URSP to facilitate network communications for the application via the user equipment, and wherein the network element is an application function operated by an application service provider or is an application function or a Domain Name System (DNS) server operated by the mobile network operator.

18. The network element of claim 17, wherein when the network element is the application function operated by the application service provider, the providing includes the policy object and the application being downloaded by the user equipment via an internet portal operated by the application service provider.

19. The network element of claim 17, wherein when the network element is the application function operated by the mobile network operator, the providing includes the policy object being downloaded by the user equipment via the application function.

20. The network element of claim 17, wherein when the network element is the DNS server operated by the mobile network operator, the providing includes an encrypted traffic descriptor portion and an encrypted route selection portion of the application specific URSP being sent to the user equipment via one or more DNS text records following a DNS query from the user equipment that is associated with the application.

* * * * *